(12) United States Patent
Bains et al.

(10) Patent No.: US 9,934,143 B2
(45) Date of Patent: Apr. 3, 2018

(54) MAPPING A PHYSICAL ADDRESS DIFFERENTLY TO DIFFERENT MEMORY DEVICES IN A GROUP

(71) Applicant: Intel Corporation, Santa Clara, CA (US)

(72) Inventors: Kuljit S. Bains, Olympia, WA (US); Suneeta Sah, Portland, OR (US); John H. Crawford, Saratoga, CA (US); Brian S. Morris, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/038,659

(22) Filed: Sep. 26, 2013

(65) Prior Publication Data

US 2015/0089183 A1    Mar. 26, 2015

(51) Int. Cl.
    *G06F 13/12*    (2006.01)
    *G06F 12/06*    (2006.01)
    *G06F 12/02*    (2006.01)

(52) U.S. Cl.
    CPC .......... *G06F 12/06* (2013.01); *G06F 12/0292* (2013.01); *G06F 12/0638* (2013.01)

(58) Field of Classification Search
    CPC .................................................. G06F 11/3037
    See application file for complete search history.

(56) References Cited

U.S. PATENT DOCUMENTS

| | | | |
|---|---|---|---|
| 5,701,438 A | 12/1997 | Bains | |
| 7,149,841 B2 * | 12/2006 | LaBerge | 711/5 |
| 7,349,233 B2 | 3/2008 | Bains et al. | |
| 7,433,992 B2 | 10/2008 | Bains | |
| 7,774,684 B2 | 8/2010 | Bains et al. | |
| 8,099,687 B2 | 1/2012 | Leddige et al. | |
| 8,438,515 B2 | 5/2013 | Leddige et al. | |
| 8,595,428 B2 | 11/2013 | Bains et al. | |
| 8,775,991 B2 | 7/2014 | Leddige et al. | |
| 8,806,298 B2 | 8/2014 | Bains | |
| 8,811,100 B2 * | 8/2014 | Ku | 365/200 |
| 8,862,973 B2 | 10/2014 | Bains et al. | |
| 8,938,573 B2 | 1/2015 | Greenfield et al. | |
| 2007/0150667 A1 | 6/2007 | Bains et al. | |
| 2008/0192559 A1 | 8/2008 | Bains et al. | |
| 2013/0117641 A1 | 5/2013 | Bains et al. | |
| 2014/0006703 A1 | 1/2014 | Bains et al. | |
| 2014/0095780 A1 | 4/2014 | Bains et al. | |
| 2014/0129766 A1 * | 5/2014 | Govindaraman | 711/105 |

(Continued)

OTHER PUBLICATIONS

Related U.S. Appl. No. 61/791,205, filed Mar. 15, 2013, 16 pages, including specification, claims and drawings.

(Continued)

*Primary Examiner* — Henry Tsai
*Assistant Examiner* — Juanito Borromeo
(74) *Attorney, Agent, or Firm* — Compass IP Law PC

(57) ABSTRACT

A memory subsystem includes a group of memory devices connected to an address bus. The memory subsystem includes logic to uniquely map a physical address of a memory access command to each memory device of the group. Thus, each physical address sent by an associated memory controller uniquely accesses a different row of each memory device, instead of being mapped to the same or corresponding row of each memory device.

19 Claims, 10 Drawing Sheets

(56) References Cited

U.S. PATENT DOCUMENTS

| | | |
|---|---|---|
| 2014/0177370 A1 | 6/2014 | Halbert et al. |
| 2014/0189228 A1 | 7/2014 | Greenfield et al. |
| 2014/0281207 A1* | 9/2014 | Mandava et al. ............. 711/106 |
| 2014/0281805 A1 | 9/2014 | Sah |

OTHER PUBLICATIONS

Related U.S. Appl. No. 61/777,089, filed Mar. 12, 2013, 15 pages, including specification, claims and drawings.

* cited by examiner

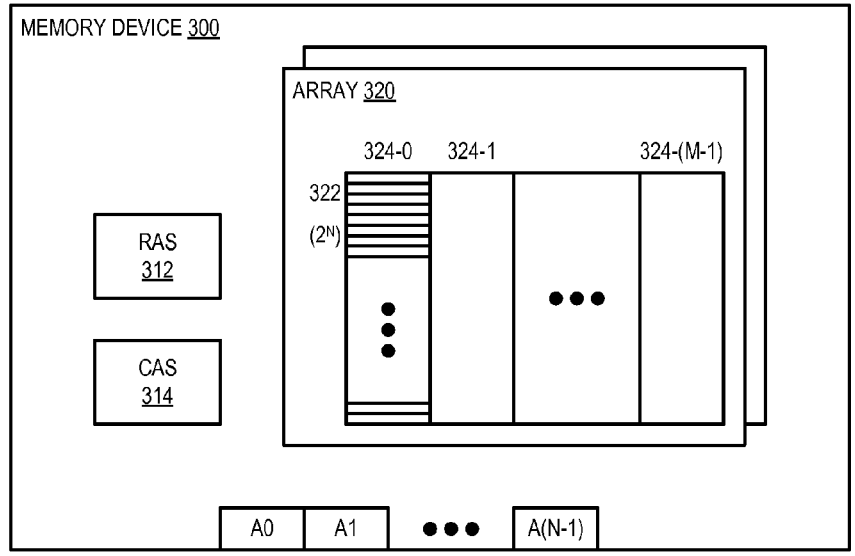

FIG. 3

4 Gb ADDRESSING TABLE 402

| CONFIGURATION | | 1 Gb x4 | 512 Mb x8 | 256 Mb x16 |
|---|---|---|---|---|
| BANK ADDRESS | # BANK GROUPS | 4 | 4 | 2 |
| | BANK GROUP ADDR | BG0-BG1 | BG0-BG1 | BG0 |
| | BANK ADDR IN BG | BA0-BA1 | BA0-BA1 | BA0-BA1 |
| ROW ADDRESS | | A0-A15 | A0-A14 | A0-A14 |
| COLUMN ADDRESS | | A0-A9 | A0-A9 | A0-A9 |
| PAGE SIZE | | 512B | 1KB | 2KB |

8 Gb ADDRESSING TABLE 404

| CONFIGURATION | | 2 Gb x4 | 1 Gb x8 | 512 Mb x16 |
|---|---|---|---|---|
| BANK ADDRESS | # BANK GROUPS | 4 | 4 | 2 |
| | BANK GROUP ADDR | BG0-BG1 | BG0-BG1 | BG0 |
| | BANK ADDR IN BG | BA0-BA1 | BA0-BA1 | BA0-BA1 |
| ROW ADDRESS | | A0-A16 | A0-A15 | A0-A15 |
| COLUMN ADDRESS | | A0-A9 | A0-A9 | A0-A9 |
| PAGE SIZE | | 512B | 1KB | 2KB |

FIG. 4

MAPPING A PHYSICAL ADDRESS DIFFERENTLY TO DIFFERENT MEMORY DEVICES IN A GROUP

FIELD

Embodiments of the invention are generally related to memory device access, and more particularly to mapping a physical address from a memory controller to different respective rows of different memory devices in a group.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2013, Intel Corporation, All Rights Reserved.

BACKGROUND

With advances in computing technology, computing devices are smaller and have much more processing power. Additionally, they include more and more storage and memory to meet the needs of the programming and computing performed on the devices. The shrinking size of the devices together with the increased storage capacity is achieved by providing higher density devices, where the atomic storage units (memory cells) within a memory device have smaller and smaller geometries.

With the latest generations of increased density, intermittent failure has appeared in some devices. For example, some existing DDR3 (dual data rate version 3) DRAM (dynamic random access memory) based systems experience intermittent failures with heavy workloads. Researchers have traced the failures to repeated access to a single row of memory within the refresh window of the memory cell. For example, for a 32 nm process in a DDR3 DRAM, if a row is accessed 550K times or more in the 64 millisecond refresh window, the physically adjacent wordline to the accessed row has a very high probability of experiencing data corruption. The row hammering or repeated access to a single row can cause migration across the passgate. The leakage and parasitic currents caused by the repeated access to one row cause data corruption in a non-accessed physically adjacent row. The failure issue has been labeled as a 'row hammer' or '1 row disturb' issue by the DRAM industry where it is most frequently seen.

One of the intermittent failures that can occur due to a row hammer condition is related to the fact memory devices are typically organized in ranks on a DIMM (dual inline memory module). The memory devices on the DIMM share a command/address (C/A) bus. When an associated memory controller issues a command for a memory access operation, all memory devices in the rank access a row of memory in response to the command. Thus, when a failure occurs due to a row hammer condition, the failure can occur in the same row of all the memory devices. While memory devices typically have data recovery mechanisms in place, failure concurrently in all the memory devices can prevent recovery of data due to the fact that all memory devices fail at the same row.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 3 is a block diagram of an embodiment of a memory device that connects uniquely within a group to a physical address bus.

FIG. 4 is an embodiment of addressing tables for a memory device group that uses hardware address swizzling.

Figure 1:
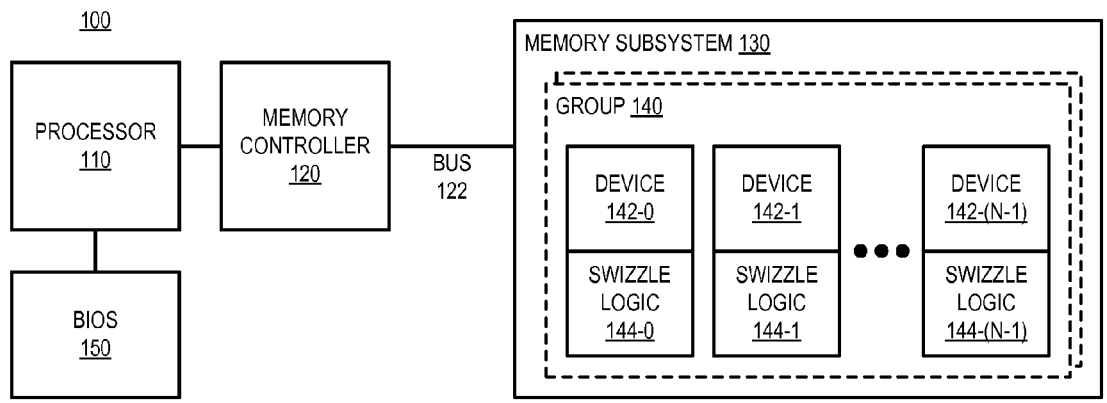
FIG. 1 is a block diagram of an embodiment of a system with a memory subsystem that has swizzle logic to provide the same physical address differently to different memory devices of a group.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a memory subsystem includes logic to differently map a physical address of a memory access command to each memory device of a group of memory devices. Thus, each physical address sent by an associated memory controller uniquely accesses a different row of each memory device, instead of being mapped to the same or a corresponding row of each memory device. Each memory device is coupled to a common address bus over which the memory controller sends the memory access command. The logic provides a unique mapping of the address information as sent by the memory controller over that common address bus. In one embodiment, the logic includes hardware swizzle logic, where different signal lines of the common address bus are routed in a unique way to each different device (e.g., by offsetting the address lines to address connections of subsequent devices). In one embodiment, the logic includes swizzle logic in the address decoding within the memory device, which can be implemented as software, hardware, or a combination. The swizzle logic can apply an operation or algorithm to map the physical address to different rows within the device. In either case, each memory device in the group can be understood to interpret the same physical address to a different logical address, implemented after the memory controller sends the physical address to the memory devices.

Address swizzling, or uniquely mapping address bits to different rows of different memory devices in a group, can reduce the effects of row hammer conditions. Row hammer conditions occur because the voltage swings and current driven when a row is activated and/or refreshed can inject noise into neighboring cells. When the noise is high enough, it can actually cause data corruption of one or more neighboring cells. The more often such an aggressor row is activated/refreshed before its victim neighbors are activated or refreshed, the higher the probability of upset or data corruption. Traditional error mitigation such as parity and ECC (error correction coding) in the memory array can provide a certain amount of mitigation to data loss due to row hammering, but parity mechanisms are typically limited to single bit corrections, and device correction codes are typically limited to an output of a single memory device in a group. If the noise is severe enough, more than one bit, or more than one memory device output can occur in the victim rows, overwhelming the protection provided by such traditional methods.

Reference made herein to memory devices can include different memory types. Memory devices are generally volatile memory devices. Volatile memory is memory whose state (and therefore the data stored on it) is indeterminate if power is interrupted to the device. Such devices typically require refreshing the data stored in the device to maintain state. For example, memory subsystems commonly use DRAM (dynamic random access memory) which is one example of a memory device as described herein, or some variant such as synchronous DRAM (SDRAM). Thus, the memory subsystem described herein is compatible with any of a number of memory technologies, such as DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), LPDDR4 (low power dual data rate version 4, specification in development as of the filing of this application), WIO2 (Wide IO2, specification in development as of the filing of this application), and/or others, and technologies based on derivatives or extensions of such specifications.

FIG. 1 is a block diagram of an embodiment of a system with a memory subsystem that has swizzle logic to provide the same physical address differently to different memory devices of a group. System 100 represents any type of computing system, which includes processor 110, memory controller 120, and memory subsystem 130. Processor 110 represents any type of microcontroller, processing unit, or other processor device that executes an operating system (OS) for system 100. Processor 110 can be single or multi-core, supporting execution of a single thread or multiple threads per core. System 100 can be a standalone computing device, or part of a larger device. Processor 110 executes instructions provided by memory subsystem 130, which in turns stores application and/or process code and data to perform the operations of system 100.

System 100 includes memory controller 120, which is a device that manages data access operations to memory subsystem 130. Thus, when processor 110 is to access data (either a read or write) in memory subsystem 130, memory controller 120 generates commands to execute the access operations. In one embodiment, memory controller 120 is part of processor 110. In one embodiment, system 100 includes BIOS (basic input/output system) 150. BIOS 150 can provide start-up or initialization control over system 100 until a host OS executed by processor 110 is loaded. In one embodiment, BIOS 150 is provided via firmware. In one embodiment, the functions of BIOS 150 are included as an initialization routine of a host OS executed by processor 110. The host OS provides a software platform on which to execute the application and/or processes that provide the functionality of system 100.

Memory subsystem 130 includes multiple memory devices 142. In one embodiment, memory subsystem 130 is divided into multiple groups 140. In one embodiment, each group 140 includes N memory devices 142. In one embodiment, group 140 is a rank of memory on a standard memory DIMM (dual inline memory module). Alternatively, group 140 can represent any other grouping of multiple memory devices, such as on a memory module. In one embodiment, memory devices 142 are DRAM chips. Memory devices 142 of group 140 are interconnected as a group due to sharing a common address bus. Thus, all N memory devices of group 140 are activated and accessed to read or write a chunk of memory (e.g., 64 bits or some other number of bits).

The common address bus can be, for example, a command/address (C/A) bus that broadcasts access commands (activate, read, write), and addresses (row addresses for activate and precharge/refresh commands, column addresses for reads and writes) to each memory device 142. Typically, each memory device 142 supplies a slice or a portion of the data for a read or write command. In current systems, each device provides a number of bits to the total number of bits in the read or write. For example, in a 64-bit system, each read or write occurs with 64 bits, and each device 142 can provide 4 (in a ×4 configuration) or 8 (in a ×8 configuration) bits. For a ×4 configuration in a 64-bit system, N will be 16. In a 64-bit system with a ×8 configuration, N will be 8. The specific numbers are provided solely for purposes of example, and it will be understood that they will be different for systems of different bit size (e.g., the configurations will be different for a 32-bit system or a 128-bit system).

In one embodiment, N will be more than what is needed to provide the number of bits. For example, a 64-bit ×8 system can include 9 memory devices 142 (instead of the 8 needed). The extra memory device can provide partial redundancy to provide error detection and/or correction. The use of an extra memory device is common in Parity or ECC (error-correcting code) methods, which are employed to recode the data stored in group 140. For example, in a ×8 configuration, adding an extra memory device (a total of 9 device) to group 140 enables use of SECDED (Single Error Correct, Double Error Detect) code that can correct a single bit error in any position, and detect double bit errors. In a ×4 configuration, adding 2 extra memory devices (for a total of 18) allows use of a device correction code that can correct any 4-bit error in a single memory device 142.

As mentioned above, row hammer conditions can cause an uncorrectable error if the error is induced in the same row of multiple memory devices. Since all memory devices 142 are coupled to a common address bus, all memory devices can be activated from the same command, at the same corresponding row of the memory device. Thus, corresponding neighboring rows of all memory devices 142 are traditionally victim rows to repeated activation. System 100 includes swizzle logic 144 that couples physical memory arrays (for example, see FIG. 3) of the memory devices to memory controller 120.

Swizzle logic 144 enables each memory device 142 to differently map address information from bus 122 to their respective memory arrays (not specifically shown). Swizzle logic 144 provides a different swizzle function for each memory device 142, as illustrated by the fact that logic 144-0 is associated with device 142-0, logic 144-1 is associated with device 142-1, and so forth. Thus, for each memory device 142, the memory access address will have a different logical address, which means that the victim row(s) of a row hammer condition will likewise have different logical addresses among the memory devices, rather than mapping to the same cache line. In one embodiment, swizzle logic 144 is implemented in hardware (for example in FIG. 2). In one embodiment, swizzle logic 144 is implemented in software or hardware (for example in FIG. 5).

Figure 2:
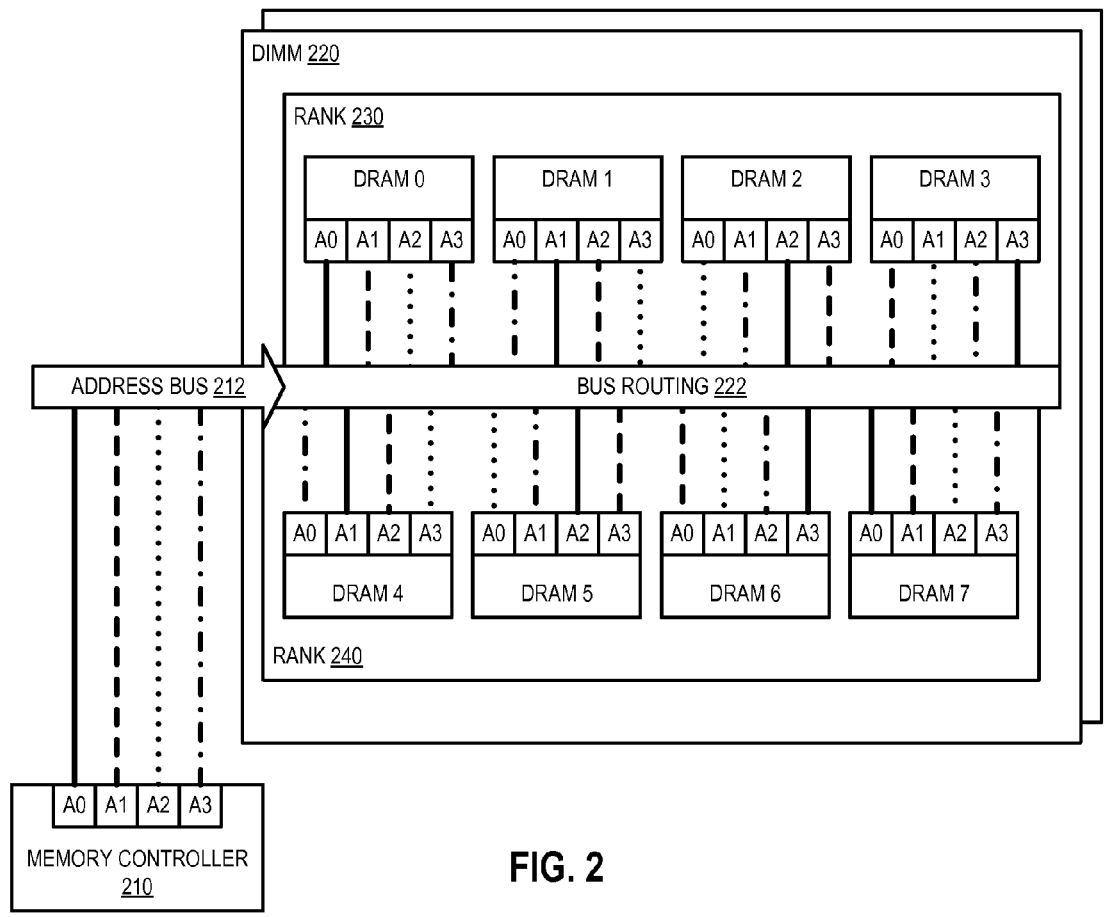
FIG. 2 is a block diagram of an embodiment of a memory subsystem in which physical address signal lines are routed differently to different memory devices of a group.

It will be understood that bus 122 represents an address bus (e.g., a C/A bus) connecting memory controller 120 to memory subsystem 130. Thus, bus 122 can be understood as an address bus of the memory subsystem. In one embodiment, the memory bus is routed differently to each memory device 142 within group 140. Thus, all devices 142 connect to the address bus, but they connect with different corresponding connectors, as illustrated in FIG. 2. In one embodiment, each memory device 142 connects with a standard pinout to bus 122, as would traditionally be expected, and then swizzles the address information internally within the memory device. Connecting the memory devices to the bus differently does not necessarily require any changes to the memory devices themselves, as swizzle logic 142 is implemented as hardware routing of the address bus to the connectors of the memory devices. Swizzle logic within the memory devices does not necessarily require any change to the layout of the memory subsystem circuitry, but would require a change to the memory devices themselves (namely, the inclusion of the swizzle logic). In one embodiment, both techniques could be combined.

It will be understood that bus 122 includes a number of signal lines, each representing a bit of the address. If the number of memory devices, N, exceeds the capacity of bits in the address bus, in one embodiment, system 100 uses additional address signal lines to uniquely map the address to rows in memory devices 132. More specifically, if the number of bits on bus 122 used to address the rows (e.g., the row address) is less than the number of memory devices 132 (i.e., the number of address bits is less than N), memory subsystem 130 can use additional address signal lines to further swizzle the address for a memory access operation. Thus, system 100 can still uniquely map a physical address to rows at different physical locations within the respective memory arrays of each respective memory device 142.

In one embodiment, swizzle logic 144 swizzles both row address bits as well as bank address bits (so that every memory device of group 140 will address a unique bank/row combination for every physical address sent by memory controller 120). In one embodiment, swizzle logic 144 swizzles both row address bits as well as an inversion signal used for group 140. It will be understood that certain memory subsystem implementations (e.g., RDIMM (registered DIMM) or LRDIMM (load reduced DIMM)) include a register or buffer between the controller/address bus, and the memory devices or DRAMs. Such implementations typically use an additional signal to invert half of a rank. The additional signal can operate in a sense as a rank section enable signal. By including the inversion signal in the bit swizzling for the row address, each half of the rank is effectively separated from each other, and the row address swizzling is unique per half of the rank.

In one embodiment, BIOS 150 is configured to store information indicating what swizzle function each specific memory device 142 uses. Such information can be particularly useful where swizzle logic 144 is implemented as logic within each respective memory device 142. Thus, BIOS 150 can understand how each memory device maps physical addresses to logical addresses within the memory device. Thus, BIOS 150 can identify victim rows for the physical addresses accessed. For example, in one embodiment, each memory device 142 executes a swizzle algorithm that uniquely maps the physical address to different rows than for any other memory device. Each memory device can implement a different algorithm or a different version of the same algorithm to provide unique mapping. BIOS 150 can store information indicating what memory devices use what functions.

FIG. 2 is a block diagram of an embodiment of a memory subsystem in which physical address signal lines are routed differently to different memory devices of a group. System 200 can be one example of a system in accordance with system 100 of FIG. 1. System 200 includes memory controller 210, which provides a physical memory address in conjunction with a memory access command. The command applies to the specified physical memory address.

As a simple illustration, four row address signal lines, A0, A1, A2, and A3, are illustrated. It will be understood that system 200 can include more row address lines not shown. More specifically, address signal line A0, A1, A2, and A3 represent common address bus 212 to which the memory devices of system 200 connect. Each signal line is represented by a different pattern, where A0 corresponds to the solid line, A1 corresponds to the dashed line, A2 corresponds to the dotted line, and A3 corresponds to the dash-dot line. Each DRAM has connectors or pins A0, A1, A2, and A3, which are traditionally connected with corresponding signal lines. Each DRAM receives the address signal lines, and will traditionally map the same physical addresses to the same or corresponding rows of their respective memory arrays, based on the fact that each corresponding connector traditionally maps to the same address signal line.

In one embodiment, system 200 implements hardware swizzle logic by routing signal lines A0, A1, A2, and A3 differently to each respective memory device per rank on DIMM 220. DIMM 220 represents a portion of a memory subsystem. Address bus 212 is received at DIMM 220 exactly as it is output from memory controller 210. Thus, connectors or pins of DIMM 220 connect in order to the signal lines of address bus 212. Bus routing 222 routes address bus 212 differently to each DRAM per rank.

Rank 230 and rank 240 are two different memory device groups. It will be observed that DRAMs of rank 230 have the same row address mapping of DRAMs of rank 240 (e.g., DRAM 0 is mapped the same as DRAM 7, DRAM 1 is mapped the same as DRAM 4, and so forth), but that each DRAM is uniquely mapped for each rank. Thus, for example, while DRAM 0 of rank 230 is mapped the same as DRAM 7 of rank 240, DRAM 0 is mapped differently from any of DRAM 1, DRAM 2, and DRAM 3, which are in the same rank (230). It will be understood that the numeric designations of the DRAMs is for illustrative purposes only, and is not intended to represent a position of the DRAM in the rank.

Address signal lines in a DIMM are typically connected in a daisy chain fashion, where row address signal A0 connects first to connector A0 of DRAM 0, then to connector A0 of DRAM 1, and so on. In system 200, the daisy chain nature of the connections can be preserved, but each signal line is moved one connector or one lane over, or one connector up per DRAM, with the address signal lines wrapping back around. Thus, for example, the signal lines corresponding to address signals A0, A1, A2, and A3 at memory controller 210 is mapped as follows for DRAM 0, DRAM 1, DRAM 2, and DRAM 3: A0, A1, A2, A3; A1, A2, A3, A0; A2, A3, A0, A1; and, A3, A0, A1, A2, respectively. Thus, signal line A0 as provided by memory controller 210 is routed to A0 on DRAM 0, to A1 on DRAM 1, to A2 on DRAM 2, and to A3 on DRAM 3. Signal line A1 as provided by memory controller 210 is routed to A1 on DRAM 0, A2 on DRAM 1, A3 on DRAM 2, and A0 on DRAM 3. The pattern can be continued for all signal lines of interest of address bus 212.

It will be understood that to swizzle the physical address lines to provide a unique address mapping for each memory device, there needs to be a number of address signal lines and corresponding connectors higher than the number of memory devices. With current systems, ×8 systems can provide address line swizzling, because there are only 8 or 9 devices per rank. For ×4 based DIMMs, there can be up to 18 devices per rank. All current ×4 based systems are based on RDIMM or LRDIMM technology discussed above, where one half of the rank is typically inverted. Thus, ×4 based DIMMs can work with hardware address swizzling by using the inversion signal in addition to the row address bits. However, if the inversion signal is swizzled with the row address bits, programming Mode Registers requires per DRAM addressability (PDA) to program correct values in the MRs.

In one embodiment, in addition to using row address bits or row address signal lines, system 200 also uses bank address bits or signal lines. The inclusion of bank address bits in modern systems could allow for allows for 16+4=20 bits for swizzling. The 20 bits is sufficient for ×4 based systems in which there are 18 devices.

In one embodiment, the address lines are mapped to one memory device, and then to each subsequent memory at an offset. In the example of system 200, such an offset of 1 address place is illustrated. It will be understood that the offset could be any numeral up to one less than the number of memory devices. Furthermore, the case of having more devices than row address signal lines is addressed above, but in the case there are more address signal lines than devices, it is not necessarily required to swizzle all address lines. For example, the system can swizzle only the first N of M total signal lines, which allows a unique mapping of N memory devices. Thus, the additional M-N signal lines are not necessarily swizzled. In one embodiment, any N of M total signal lines can be swizzled, while leaving the remaining lines unaffected.

FIG. 3 is a block diagram of an embodiment of a memory device that connects uniquely within a group to a physical address bus. Memory device 300 can be one example of a memory device 142 of system 100, and/or a DRAM of system 200. Memory device 300 can be any type of DRAM devices.

Device 300 includes N row address line connectors, A0-A(N−1). In one embodiment, there are additional address line connectors, for example, to specify bank group and bank address. In one embodiment, the system swizzles the address bus signal lines of a shared address bus to the connectors of device 300. Thus, while traditionally A0 would correspond to signal line A0 on the shared address bus as provided by an associated memory controller, address line swizzling means that potentially any of the N address lines of the address bus as provided by the memory controller could be connected to any of the address connectors. Such a configuration allows memory device 300 and other memory devices in a group to operate normally, but each activating different rows for the same physical address.

Memory address signals received on connectors A0-A(N−1) select among the $2^N$ rows 322 of memory array 320, such as a memory bank. Memory device 300 can include one or more arrays 320. The specific row 322 of a memory access command is indicated by the bit pattern received from an address bus at connectors A0-A(N−1). Thus, swizzling the address line signals among different memory devices of a memory device group will cause each memory device to select different rows in response to receiving the same physical address.

Memory device 300 includes row address strobe or select (RAS) logic 312 and column address strobe or select (CAS) logic 314. RAS logic 312 decodes the address information received on connectors A0-A(N−1) and selects a particular row 322 based on the address. The row is activated for the particular access operation, which can occur in response to CAS logic 314 selecting one of columns 324. The data at the particular row and column is stored in an output buffer and returned for a read. For a write, the data can be stored in the buffer and then stored in the memory array at the particular row and column selected.

FIG. 4 is an embodiment of addressing tables for a memory device group that uses hardware address swizzling. Table 402 illustrates an example bit configuration for a 4 Gb memory subsystem. There are three typical configurations for a 4 Gb system, which is to have an ×4 design, a ×8 design, or a ×16 design. For the ×4 design, the number of row address bits is 16 (A0-A15). In the ×8 and ×16 designs, there are 15 row address bits or signal lines (A0-A14). In one embodiment, bank address bits BA0-BA1 are also swizzled with the row address bits.

Table 404 illustrates an example bit configuration for an 8 Gb memory subsystem. There are three typical configurations for an 8 Gb system, which is to have an ×4 design, a ×8 design, or a ×16 design. For the ×4 design, the number of row address bits is 17 (A0-A16). In the ×8 and ×16 designs, there are 16 row address bits or signal lines (A0-A15). In one embodiment, bank address bits BA0-BA1 are also swizzled with the row address bits.

Figure 5:
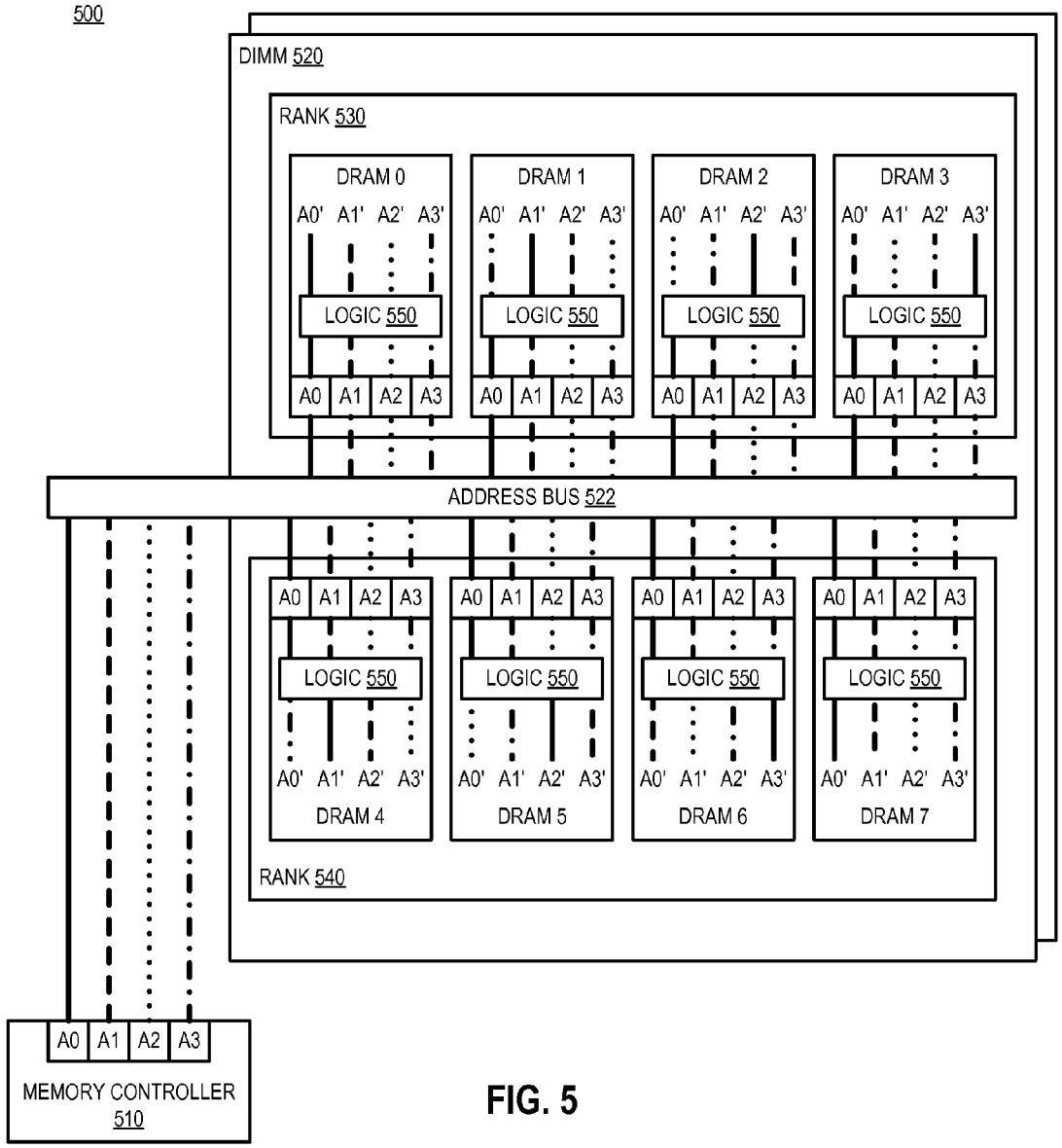
FIG. 5 is a block diagram of an embodiment of a memory subsystem that uses logical address swizzling.

FIG. 5 is a block diagram of an embodiment of a memory subsystem that uses logical address swizzling. System 500 can be one example of a system in accordance with system 100 of FIG. 1. System 500 includes memory controller 510, which provides a physical memory address in conjunction with a memory access command. The command applies to the specified physical memory address provided by memory controller 510.

Similar to system 200 of FIG. 2, system 500 provides a simple illustration with four row address signal lines, A0, A1, A2, and A3 provided from memory controller 510 to the memory devices of DIMM 520. It will be understood that system 500 can include more row address lines not shown. Address signal lines A0, A1, A2, and A3 represent common address bus 522 to which the memory devices of system 500 connect. Each signal line of the address bus is represented by a different pattern, where A0 corresponds to the solid line, A1 corresponds to the dashed line, A2 corresponds to the dotted line, and A3 corresponds to the dash-dot line. Each DRAM has connectors or pins A0, A1, A2, and A3, which connect to address bus 522. Each DRAM connector connects to a corresponding signal line (e.g., connector A0 of each DRAM device connects to signal line A0 as provided by memory controller).

In one embodiment, system 500 implements swizzle logic within each DRAM by uniquely mapping the incoming address signal lines with logic 550 to produce a swizzled address. The swizzled address is represented as signals A0', A1', A2', and A3'. It will be observed how each DRAM within a rank uniquely maps the address signal lines to a different swizzled address. DIMM 520 represents a portion of a memory subsystem. Address bus 522 is received at DIMM 520 exactly as it is output from memory controller 510, and routed to the DRAMs of ranks 530 and 540. Rank 530 and rank 540 are two different memory device groups. It will be observed that certain DRAMs of rank 530 have the same row address mapping of DRAMs of rank 540 (e.g., DRAM 0 is mapped the same as DRAM 7, DRAM 1 is mapped the same as DRAM 4, and so forth), but that each DRAM is uniquely mapped for each rank. Thus, for example, while DRAM 0 of rank 530 is mapped the same as DRAM 7 of rank 540, DRAM 0 is mapped differently from any of DRAM 1, DRAM 2, and DRAM 3, which are in the same rank (530). It will be understood that the numeric designations of the DRAMs is for illustrative purposes only, and is not intended to represent a position of the DRAM in the rank.

While every DRAM 0-7 is illustrated with a block labeled as logic 550, it will be understood that for each DRAM to generate a unique mapping of the physical address, each logic block 550 will map the physical address with a different function within a rank or memory group. Logic 550 can be referred to as swizzle logic or mapping logic. In one embodiment, logic 550 performs a hash function. Thus, logic 550 of each different DRAM performs a different hash function to provide a unique mapping for the DRAMs within the rank. In general, logic 550 can be said to apply a different mapping pattern at each different memory device. Suppose that rank 530 is a ×4 design that includes 18 DRAM chips. In such an example, each DRAM chip would be configured to use a different hash function or swizzle function for the row address.

In one embodiment, logic 550 represents a hard-wired logic function. Thus, each rank 530 and 540 can include one DRAM of each different logic function type (hardware configured to implement a particular swizzle function). Note that there is no need to have a given DRAM in any particular relationship to the others, so long as each has a different row address swizzle function. Thus, no two memory devices in a rank or memory group will use the same row address swizzle or hash function. In one embodiment, logic 550 swizzles address data for core accesses (e.g., access to the memory arrays, but does not swizzle address data for Mode Register accesses.

In one embodiment, every DRAM device is configurable to apply any one of a number of swizzle functions (e.g., there could be 18 unique swizzle functions). After manufacturing, each DRAM device can be configured to use an appropriate swizzle function to provide a unique physical address mapping. The configuration of the specific function to apply can be performed when assembling the memory devices into a DIMM rank or other grouping (for example, by fusing configurable bits), or can be performed on power-up of a system containing the DIMM through programming commands during memory initialization. In one embodiment, a BIOS (not specifically shown) stores information about a mapping pattern (e.g., what hash function) each memory device executes. Thus, the BIOS of the computing system of which the memory devices are a part will store information that indicates what mapping pattern, hash function, algorithm, or other swizzle mechanism each memory device uses. In one embodiment, each memory device registers with the BIOS to indicate its swizzle mechanism.

It will be understood that modern DRAM chips are manufactured with extra rows to allow mapping out one or more rows that suffer a manufacturing defect. Thus, a particular row that fails one or more post-manufacturing tests can be mapped out in logic in the DRAM device. There are typically many extra rows which can be used to map out defective rows. When a physical address is received for the address for that specific row, the memory device accesses the substitute row instead. As a result, one or more rows of a memory device can potentially be taken out of the normal addressing scheme within the memory device. Thus, there is a possibility that address swizzling as described herein (whether hardware swizzling or software/firmware swizzling) can end up mapping the same physical address to the same physical row in multiple memory devices of a rank or memory device group.

However, it will be understood that statistically speaking, it is extremely likely that such an occurrence would ever happen—it would require multiple memory devices to have a failed row mapped out to the extra row space, and then require that a swizzling mechanism map the same physical address to exactly the same physical row of the extra row space. The chances that such a circumstance could actually exist and render the same physical victim rows in multiple memory devices within the same memory device group, is not statistically significant. Thus, even though such a possibility exists, it is not considered to affect the uniquely mapping of a physical address to different rows of the memory devices of the rank or memory device group. Even to the extent that such a possibility is somehow understood to mean that not every device in the group uniquely maps the physical address, the other devices in the group do uniquely map the physical address. Additionally, even the devices that map to the extra row space can be considered to uniquely map the physical address to a different row, but it could happen that the row to which it is uniquely mapped is then re-mapped again to the substitute row.

Figure 6:
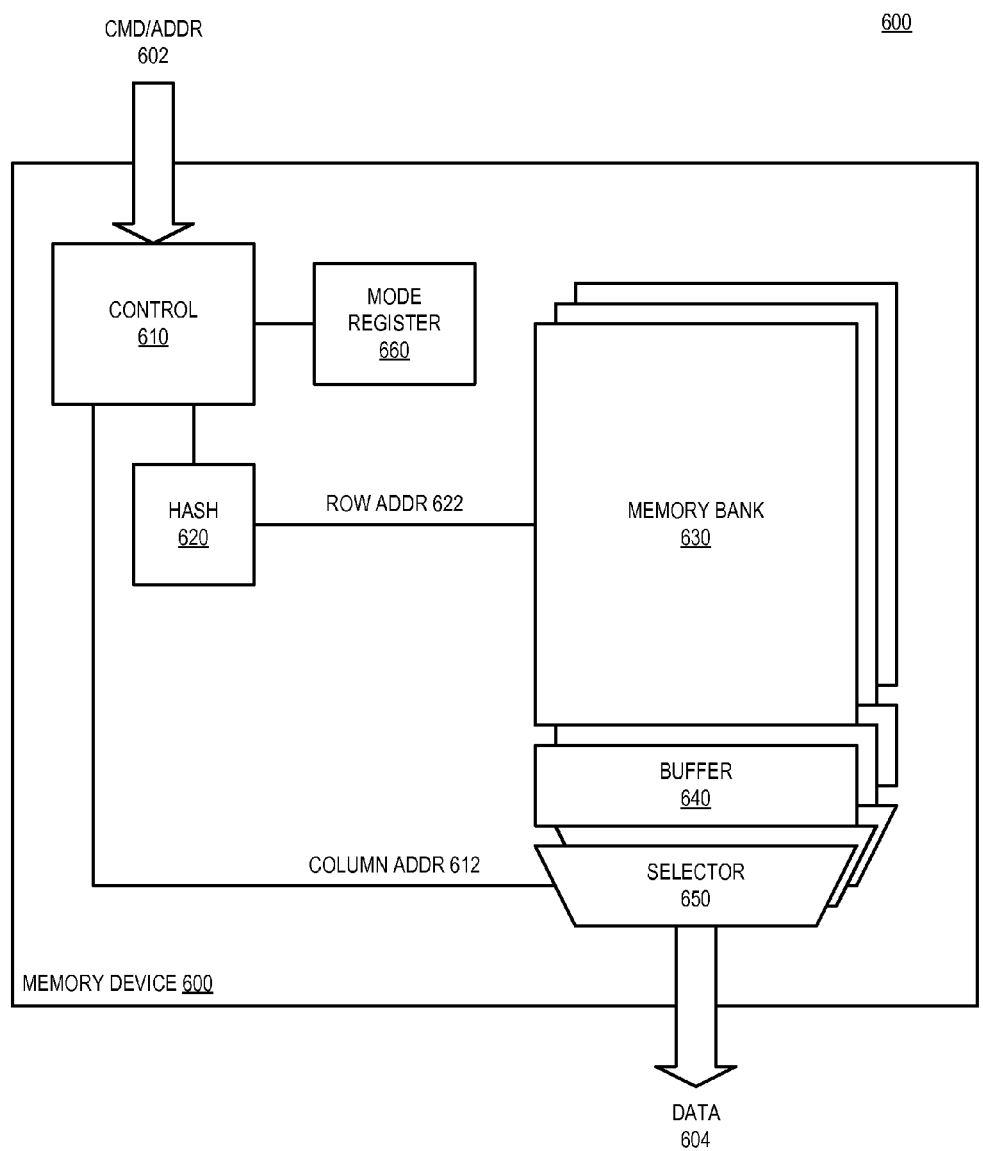
FIG. 6 is a block diagram of an embodiment of a memory device that uniquely maps a physical address to a memory array based on logical address swizzling.

FIG. 6 is a block diagram of an embodiment of a memory device that uniquely maps a physical address to a memory array based on logical address swizzling. Memory device 600 can be one example of a memory device 142 of system 100, and/or a DRAM of system 500. Memory device 600 connects to command address (CMD/ADDR) bus 602. Memory device 600 includes at least N connectors or pins that connect to individual signal lines of bus 602, for $2^N$ rows of memory in each memory bank 630. Control logic 610 receives the information received on bus 602, and can determine what operation is requested and drive addresses to select either a row (for Activate or Precharge/Refresh) or a column in the buffer 640 (for a read or write). Row selection is determined by row address 622. Column selection is determined by selector 650 via column address 612. The row and column selection generates a single chunk of data 604 from each memory device in a group, the joining of which provides the data requested for the memory access function/operation specified by the memory controller over bus 602.

A rank of memory devices will include multiple equivalent devices, each of which can be individually represented as memory device 600. Applying a standard configuration, each memory device 600 in the rank or memory device group will operate in parallel as the memory controller sends commands over bus 602. More specifically, each memory device 600 will end up accessing exactly the same corresponding row for any Activate, Precharge, or Refresh command. It will be understood that "exactly the same row" is subject to the mapping out of defective rows as discussed above, in which case each memory device 600 will access the same row, but one or more memory devices may instead access a substitute row. In the case of repeated accesses to the same aggressor row, the adjacent victim rows (typically at row addresses ±1 from the aggressor row) will have identical row addresses in all of the memory devices or DRAM chips in the rank. Consequently, if enough repeated accesses to an aggressor row occur before the victim rows are refreshed (typically a 64 msec period), bits may be upset in many or all of the memory devices in the same victim rows (±1 from the aggressor row). If enough errors (>1 for SECDED, >4 adjacent for device correction) accumulate in one or both of the victim rows, the protection provided can be overwhelmed and either a system crash or a silent data corruption can occur on an access to those victim rows.

Memory device 600 addresses the victim row issue by including a logic block between control logic 610 and memory banks 630, which include the rows of memory. The logic block is represented as hash block 620, which can execute an algorithm to hash the row addresses used to select a row to activate/refresh. In one embodiment, hash logic 620 is part of control logic 610. In one embodiment, hash logic 620 is standalone logic in memory device 600. In one embodiment, configuration of the row address hash functions includes configuring each memory device 600 with a different hash function or mapping pattern. Thus, each memory device 600 in a rank will uniquely scramble the neighboring row relationship within the respective memory devices.

When memory devices are included on a DIMM, for M memory devices in a given rank, configuration of the memory devices should assign M hash functions on the row addresses, one for each memory device 600. Thus, each memory device 600 will have hash logic 620 that has the property that the victim rows adjacent to a given aggressor row in one memory device are not victim rows in any other memory device in the rank. Such an arrangement ensures that a single overly active aggressor row will upset at most one memory device chunk of any victim row on the DIMM. For example, in a ×4 configuration with device correction, instead of an overly active aggressor row upsetting the same two neighboring victim rows in all 18 of the memory devices, the hash functions spread the damage to result in noise injected into one piece (4 bits from one memory device) of 18 different pairs of victim rows, or 36 such pieces of victim rows. If there is only one such aggressor row, the scrambling or swizzling of the victim neighbors allows the traditional device correction coding to correct the damaged piece of data of a neighboring row in each of the 36 lines potentially damaged by a particular aggressor. Because there are a large number of rows in a modern memory devices (e.g., on the order of 10^4), the chance of having two or more aggressor rows collide on the same victims becomes small through the use of address swizzling or scrambling.

The row address swizzling results in row address information 622 to apply to memory banks 630. The row address swizzling can be more formally expressed as hashing a row address provided to each memory device 600 by an associated memory controller to cause adjacent rows to back map to a different input row address in each hash. To effectively hash the row address information for all memory devices in group, the system will use R hash functions Hi( ) with their inverse mappings Hinvi, where: Hinvi(Hi(a)±1)≠Hinvk(Hk(a)±1) for all k≠i, for all a.

In one embodiment, control logic 610 can determine if the command on bus 602 is a Mode Register access or a core access to memory bank 630. Control logic 610 sends address information for core accesses to hash logic 620 to swizzle the row address 622. Control logic 610 can send address information for Mode Register accesses directly to Mode Register 660 without swizzling the address information. Mode Register 660 stores configuration information for memory device 600, and can set a mode of operation of the memory device for specific commands (e.g., it can affect how control logic 610 decodes command information).

Figure 7:
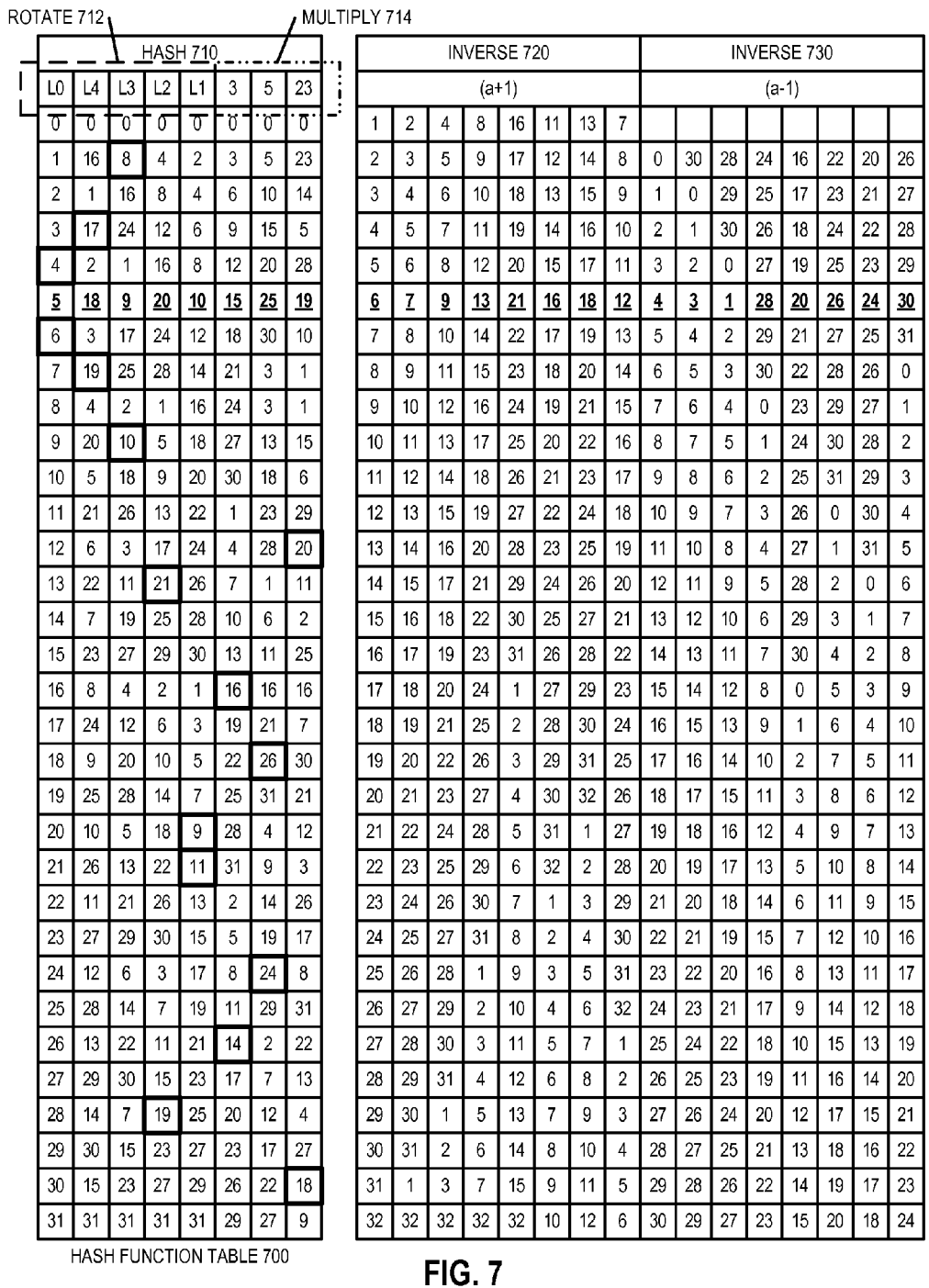
FIG. 7 is an embodiment of a swizzle hash function table for a memory device group that uses logical address swizzling.

FIG. 7 is an embodiment of a swizzle hash function table for a memory device group that uses logical address swizzling. Hash function table 700 provides an example of a hash function that can be used to provide unique row address mapping to different memory devices in a group. More specifically, table 700 includes a combination of two different types of candidate hash functions. Any one or more hash functions can be used to generate unique mapping function logic.

In one embodiment, one set of candidate hash functions would be to use prime numbers Pi, and then have Hi(a)=a·Pi mod $2^m$, where $2^m$ is the number of rows, or m is the number of bits in the row address. The use of prime number based hashing can introduce delay into the processing of the row address bits. Picking prime number that have a limited number of '1' bits can reduce the delay introduced. A prime number hash function can use a circuit that has a CSA (carry save adder) tree to add 3 or 4 terms, and feed the inputs from muxes that choose shifted versions of the input address. The output of the CSA tree can either be consolidated to an address using a carry-propagate adder, or known techniques to decode a row address from the carry-save form output from the CSA tree can be used directly to reduce latency.

In one embodiment, another set of candidate hash functions would be to rotate the address bits. Bit rotation of binary numbers is equivalent to multiplying the address by $2i \bmod (2^m-1)$ for a rotation left by i bits. Bit rotation can be accomplished with a rotate/shifter in the address path of the row address, or an m-way mux.

If there are insufficient row bits (e.g., 14) to support the number of hash functions needed (e.g., 18 for a ×4 device correction configuration), a candidate hash function that uses more bits can be selected. Alternatively, multiple candidate hash functions can be mixed and matched. Table 700 illustrates the use of a rotation hash function 712 for a 5-bit row address, as well as a multiply by prime number hash function 714 for 3 more bits of address space. The leftmost 8 columns show example hash functions (hash 710) of the addresses, with the left 5 columns (L0, L1, L2, L3, L4) showing rotation 712 of the address bits, and the rightmost 3 columns (3, 5, 23) showing a multiplication by prime numbers 3, 5, and 23, respectively. The farthest left column is the input address (labeled with "L0", for rotate left by 0 in the header row). The next four columns to the right show rotation left by 4 (L4), 3 (L3), 2 (L2), and 1 (L1). Each one of the eight columns can represent a different memory device of the memory device group.

The row corresponding to input address 5 is shown in bold and underline for emphasis. Input address 5 is hashed to different output addresses by the hash functions to 5, 18, 9, 20, 10, 15, 25, and 19. The rightmost columns provide an inverse mapping of the victim rows that are a+1 (inverse 720) and a−1 (inverse 730) from row 5. Inverse hash functions 720 and 730 are used to highlight the corresponding victim rows in each memory device represented by each of the columns in hash 710. The victim rows are highlighted with a bold line. The inverse mapping of the victim rows from aggressor row at address 5 are inverse mapped to different addresses in each memory device, satisfying the hash function requirement mentioned above. Thus, for example, column L0 for row 5 has victim rows 4 and 6; column L1 has a value of 18 in row 5, and thus has victim rows of 17 and 19; column L2 has a value of 9 in row 5, and thus has victim rows of 4 and 6; and so forth.

Figure 8:
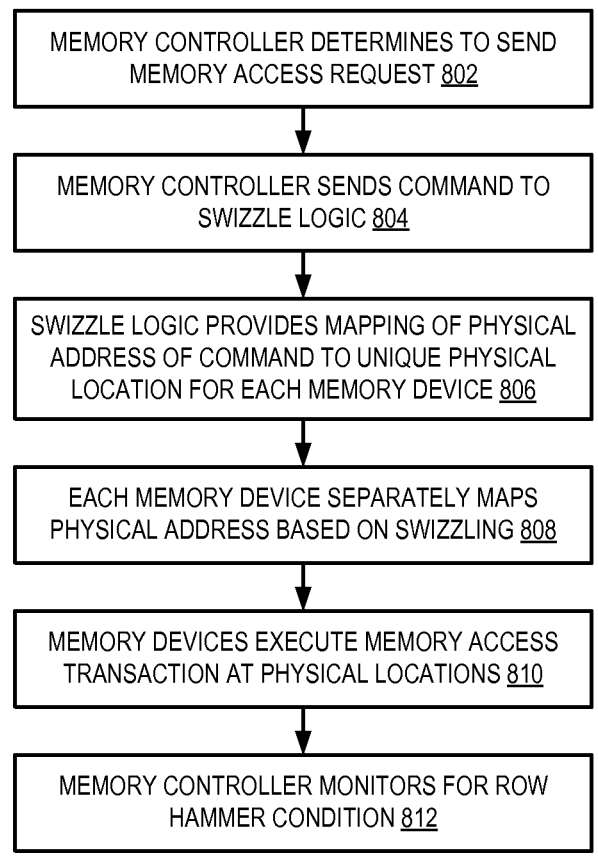
FIG. 8 is a flow diagram of an embodiment of a process for address swizzling.

FIG. 8 is a flow diagram of an embodiment of a process for address swizzling. A memory controller associated with a group of memory devices determines to send a memory access request, 802. The memory controller generates the access request responsive to a command generated by an associated processor or host controller of a computing system of which the memory device group and memory controller are a part. Typically, the processor issues commands for data access in memory (e.g., read or write), referencing a virtual or logical memory address. The memory controller decodes the logical memory address into a physical memory address. The memory controller sends a command with the physical memory address to the memory devices, to be received by swizzle logic that maps the physical memory address at the memory devices, 804.

The swizzle logic provides a mapping of the physical address to unique physical rows or a unique physical location for each memory device, 806. In one embodiment (see FIG. 9A), the swizzle logic is implemented on the DIMM or in the memory subsystem external to the memory devices. In one embodiment (see FIG. 9B), the swizzle logic is implemented within each memory device of the memory subsystem. Thus, each memory device separately maps the physical address to a unique physical location based on the swizzling, 808.

The memory devices execute a memory access transaction at the unique physical locations, 810. Thus, if one physical address is an aggressor in that the memory controller repeatedly accesses the same physical address a threshold number of times within a time window, the victim rows associated with the physical address will be different in each memory device. In one embodiment, the memory controller monitors for a row hammer condition caused by an aggressor physical address, 812, and can perform row hammer mitigation techniques. In one embodiment, if a row hammer condition results in data corruption at the victim rows of the aggressor physical address, the memory devices can perform error recovery via one or more error recovery mechanisms, given that the victim rows will be different for each memory device, preventing overwhelming the protection mechanisms.

Figure 9A:
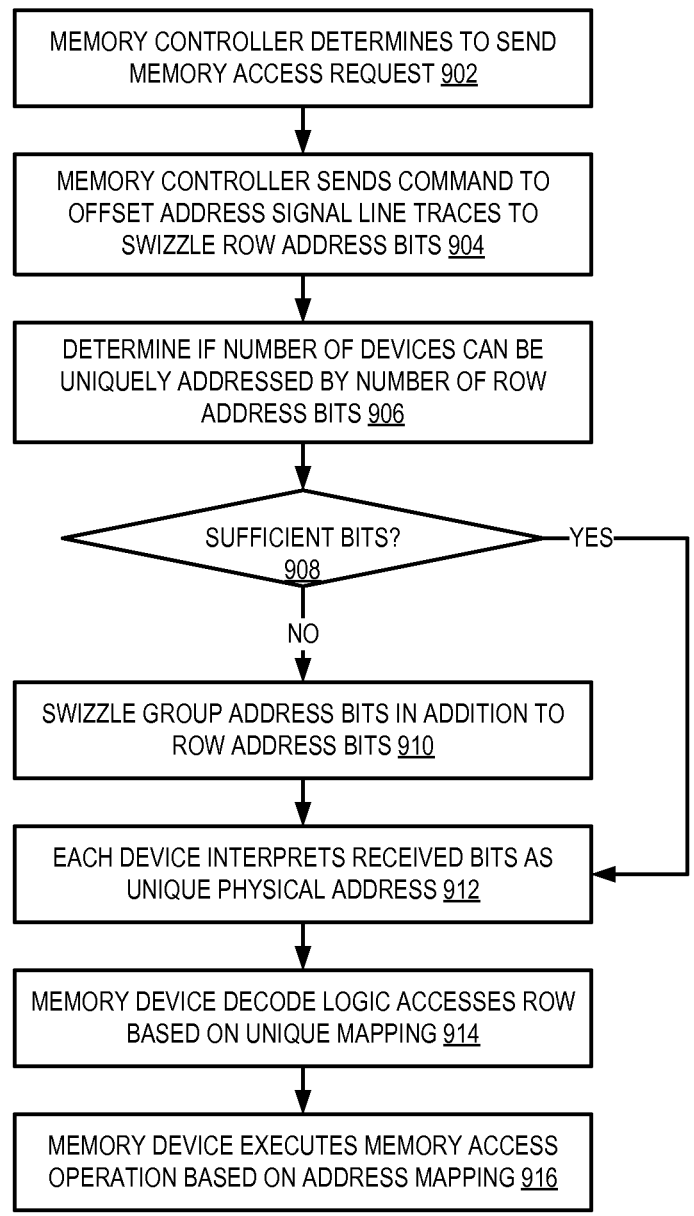
FIG. 9A is a flow diagram of an embodiment of a process for physical address swizzling.

FIG. 9A is a flow diagram of an embodiment of a process for physical address swizzling. The flow of FIG. 9A is an embodiment of a process in accordance with the flow of FIG. 8, specifically for swizzling address data externally to the memory devices. The memory controller determines to send a memory access request in response to an access command sent by a processor device, 902. The memory controller generates a command to issue the request, and sends the command to the memory devices. More particularly, in one embodiment, the memory controller sends the command to offset address signal line traces that have the effect of swizzling the row address bits, 904.

The system designer can determine if the number of memory devices to be placed in the memory group can be uniquely addressed by the number of row address bits, 906. If the number of bits is not sufficient for each memory device to receive a unique bus mapping, 908 NO branch, the system designer can configure the system to swizzle group address bits in addition to row address bits, 910. For example, rank address bits can be used. In another example, rank inversion bits can be used. However the system designer configures the system, the system will operate to swizzle the address bits (e.g., row address bits or row address bits plus additional bits) to provide a unique address bus mapping to each memory device in the group.

With the system configured to swizzle an appropriate number of bits to uniquely map each memory device, whether by using row address bits alone, 908 YES branch, or by using row address bits in combination with additional address bits, 910, each memory device in the group interprets the received address bits as a unique physical address, 912. More specifically, the memory devices do not need to know how they are connected to the address bus, and they can simply process the address bits as customarily done. The result of the processing will be that each memory device maps the same physical address to different physical locations.

Thus, the memory devices decode the received bits, and decode logic in the memory device accesses a row based on the unique mapping, 914. The memory device then executes the memory access transaction or operation based on the address mapping, 916.

Figure 9B:
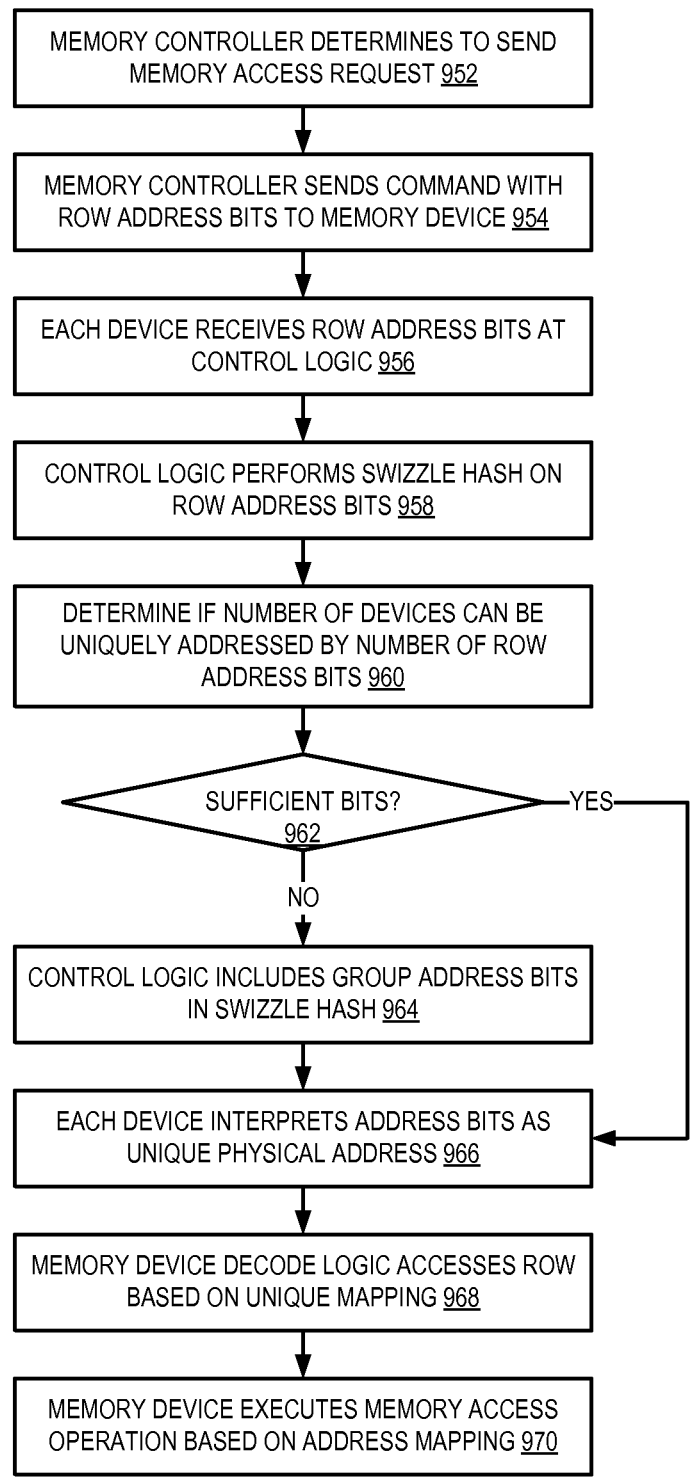
FIG. 9B is a flow diagram of an embodiment of a process for logical address swizzling.

FIG. 9B is a flow diagram of an embodiment of a process for logical address swizzling. The flow of FIG. 9B is an embodiment of a process in accordance with the flow of FIG. 8, specifically for swizzling address data internally to the memory devices. The memory controller determines to send a memory access request in response to an access command sent by a processor device, 952. The memory controller generates a command to issue the request, and sends the command to the memory devices. More particularly, in one embodiment, the memory controller sends the command with row address bits to the memory devices, 954.

Each memory device receives the row address bits at control logic internal to the memory device, 956. The control logic can determine what operation to perform, as well as decoding the physical location of the memory array targeted by the operation. In one embodiment, the control logic (or other control logic coupled to the decode control logic) performs a swizzle hash on the row address bits for access to the memory array, 958. The logic to perform the swizzle hash can include hardware logic circuits and/or software implemented on a processing device.

The system designer can determine if the number of memory devices to be placed in the memory group can be uniquely addressed by the number of row address bits, 960. If the number of bits is not sufficient for each memory device to receive a unique bus mapping, 962 NO branch, the system designer can configure the control logic to swizzle group address bits in addition to row address bits with the swizzle hash, 964. For example, rank address bits can be used. In another example, rank inversion bits can be used. However the system designer configures the system, the system will operate to swizzle the address bits (e.g., row address bits or row address bits plus additional bits) to provide a unique address bus mapping to each memory device in the group.

With the system configured to swizzle an appropriate number of bits to uniquely map each memory device, whether by using row address bits alone, 962 YES branch, or by hashing row address bits in combination with additional address bits, 964, each memory device in the group interprets the received address bits as a unique physical address, 966. Thus, each memory device maps the same physical address to different physical locations. The memory devices decode the mapped address bits to the memory array, and decode logic in the memory device accesses a row based on the unique mapping, 968. The memory device then executes the memory access transaction or operation based on the address mapping, 970.

Figure 10:
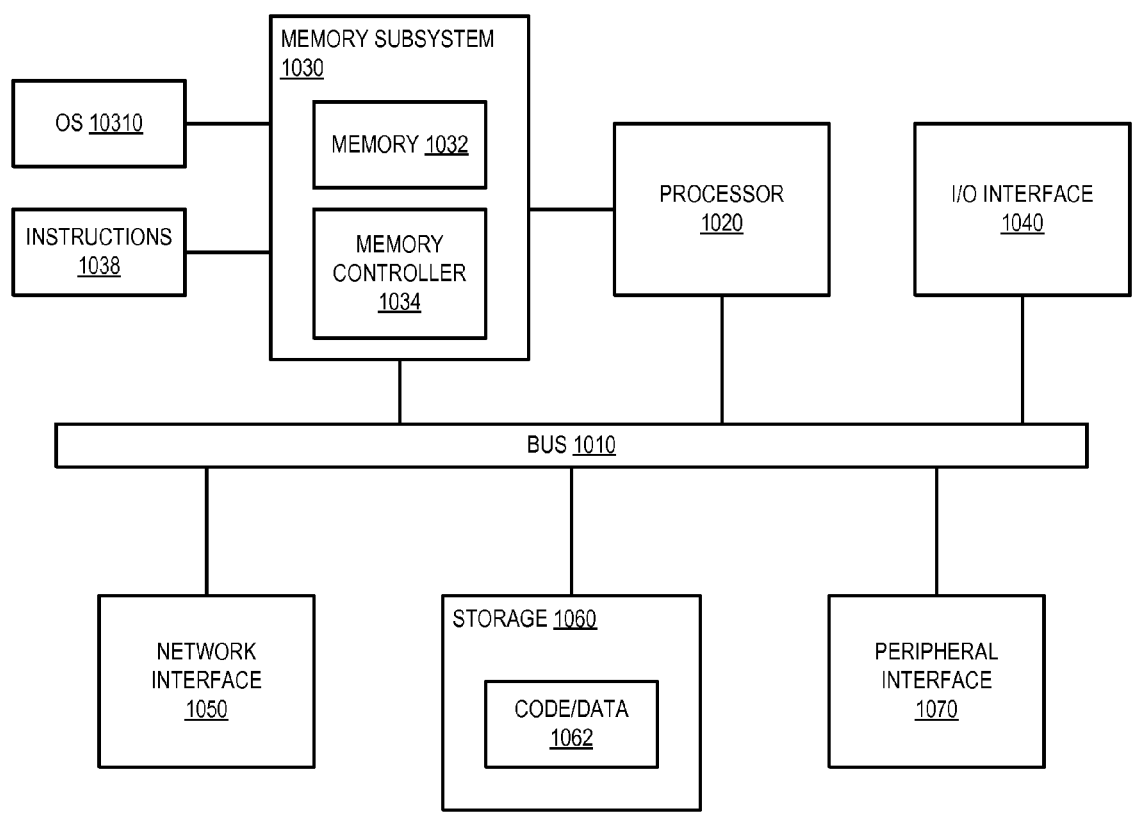
FIG. 10 is a block diagram of an embodiment of a computing system in which address swizzling can be implemented.

FIG. 10 is a block diagram of an embodiment of a computing system in which address swizzling can be implemented. System 1000 represents a computing device in accordance with any embodiment described herein, and can be a laptop computer, a desktop computer, a server, a gaming or entertainment control system, a scanner, copier, printer, routing or switching device, or other electronic device. System 1000 includes processor 1020, which provides processing, operation management, and execution of instructions for system 1000. Processor 1020 can include any type of microprocessor, central processing unit (CPU), processing core, or other processing hardware to provide processing for system 1000. Processor 1020 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 1030 represents the main memory of system 1000, and provides temporary storage for code to be executed by processor 1020, or data values to be used in executing a routine. Memory subsystem 1030 can include one or more memory devices such as read-only memory (ROM), flash memory, one or more varieties of random access memory (RAM), or other memory devices, or a combination of such devices. Memory subsystem 1030 stores and hosts, among other things, operating system (OS) 1036 to provide a software platform for execution of instructions in system 1000. Additionally, other instructions 1038 are stored and executed from memory subsystem 1030 to provide the logic and the processing of system 1000. OS 1036 and instructions 1038 are executed by processor 1020. Memory subsystem 1030 includes memory device 1032 where it stores data, instructions, programs, or other items. In one embodiment, memory subsystem includes memory controller 1034, which is a memory controller to generate and issue commands to memory device 1032. It will be understood that memory controller 1034 could be a physical part of processor 1020.

Processor 1020 and memory subsystem 1030 are coupled to bus/bus system 1010. Bus 1010 is an abstraction that represents any one or more separate physical buses, communication lines/interfaces, and/or point-to-point connections, connected by appropriate bridges, adapters, and/or controllers. Therefore, bus 1010 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 1010 can also correspond to interfaces in network interface 1050.

System 1000 also includes one or more input/output (I/O) interface(s) 1040, network interface 1050, one or more internal mass storage device(s) 1060, and peripheral interface 1070 coupled to bus 1010. I/O interface 1040 can include one or more interface components through which a user interacts with system 1000 (e.g., video, audio, and/or alphanumeric interfacing). Network interface 1050 provides system 1000 the ability to communicate with remote devices (e.g., servers, other computing devices) over one or more networks. Network interface 1050 can include an Ethernet adapter, wireless interconnection components, USB (universal serial bus), or other wired or wireless standards-based or proprietary interfaces.

Storage 1060 can be or include any conventional medium for storing large amounts of data in a nonvolatile manner, such as one or more magnetic, solid state, or optical based disks, or a combination. Storage 1060 holds code or instructions and data 1062 in a persistent state (i.e., the value is retained despite interruption of power to system 1000). Storage 1060 can be generically considered to be a "memory," although memory 1030 is the executing or operating memory to provide instructions to processor 1020. Whereas storage 1060 is nonvolatile, memory 1030 can include volatile memory (i.e., the value or state of the data is indeterminate if power is interrupted to system 1000).

Peripheral interface 1070 can include any hardware interface not specifically mentioned above. Peripherals refer generally to devices that connect dependently to system 1000. A dependent connection is one where system 1000 provides the software and/or hardware platform on which operation executes, and with which a user interacts.

System 1000 includes multiple memory devices 1032 associated with memory controller 1034. In one embodiment, memory subsystem 1030 of system 1000 implements swizzle logic to uniquely map physical addresses provided by memory controller 1034 to physical locations of memory device 1032. More particularly, memory devices 1032 are organized as groups (e.g., a rank) of devices. Each memory device 1032 in the group uniquely maps each physical address to a different physical location of the respective memory devices based on scrambling of the row address information by swizzle logic.

Figure 11:
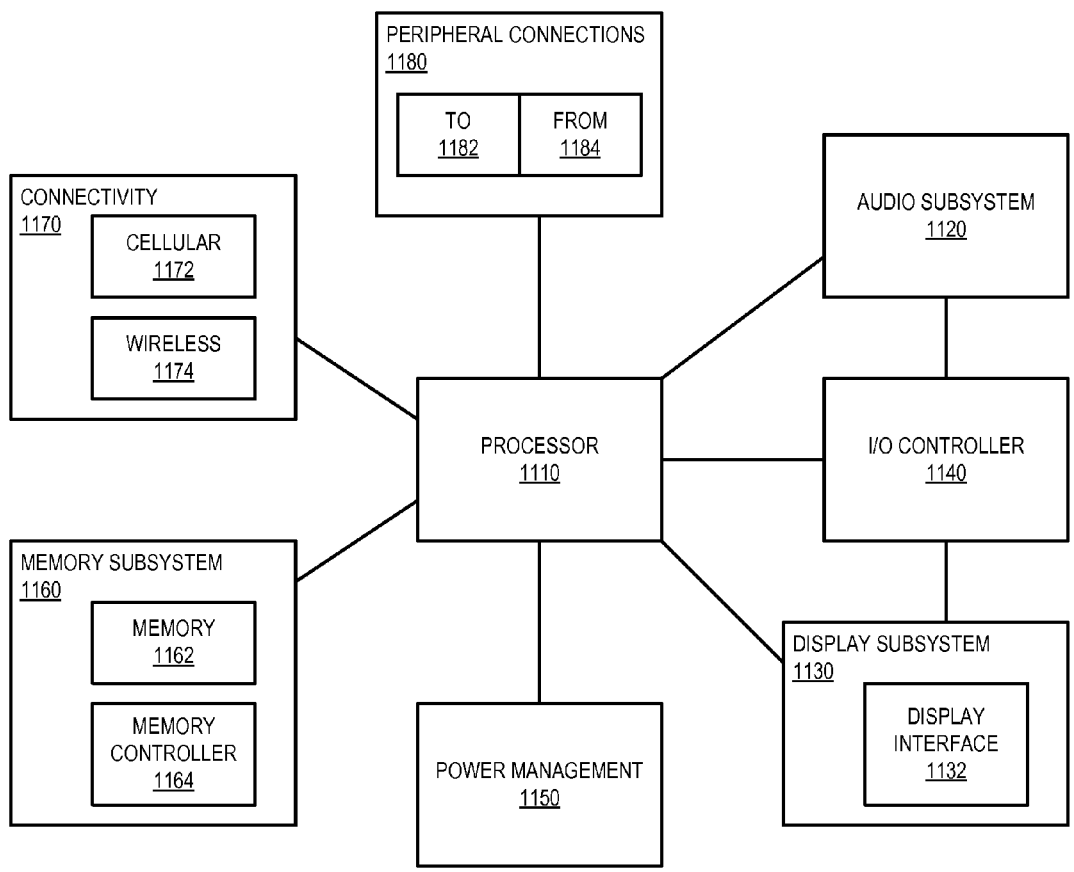
FIG. 11 is a block diagram of an embodiment of a mobile device in which address swizzling can be implemented.

FIG. 11 is a block diagram of an embodiment of a mobile device in which address swizzling can be implemented. Device 1100 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 1100.

Device 1100 includes processor 1110, which performs the primary processing operations of device 1100. Processor 1110 can include one or more physical devices, such as microprocessors, application processors, microcontrollers, programmable logic devices, or other processing means. The processing operations performed by processor 1110 include the execution of an operating platform or operating system on which applications and/or device functions are executed. The processing operations include operations related to I/O (input/output) with a human user or with other devices, operations related to power management, and/or operations related to connecting device 1100 to another device. The processing operations can also include operations related to audio I/O and/or display I/O.

In one embodiment, device 1100 includes audio subsystem 1120, which represents hardware (e.g., audio hardware and audio circuits) and software (e.g., drivers, codecs)

components associated with providing audio functions to the computing device. Audio functions can include speaker and/or headphone output, as well as microphone input. Devices for such functions can be integrated into device 1100, or connected to device 1100. In one embodiment, a user interacts with device 1100 by providing audio commands that are received and processed by processor 1110.

Display subsystem 1130 represents hardware (e.g., display devices) and software (e.g., drivers) components that provide a visual and/or tactile display for a user to interact with the computing device. Display subsystem 1130 includes display interface 1132, which includes the particular screen or hardware device used to provide a display to a user. In one embodiment, display interface 1132 includes logic separate from processor 1110 to perform at least some processing related to the display. In one embodiment, display subsystem 1130 includes a touchscreen device that provides both output and input to a user.

I/O controller 1140 represents hardware devices and software components related to interaction with a user. I/O controller 1140 can operate to manage hardware that is part of audio subsystem 1120 and/or display subsystem 1130. Additionally, I/O controller 1140 illustrates a connection point for additional devices that connect to device 1100 through which a user might interact with the system. For example, devices that can be attached to device 1100 might include microphone devices, speaker or stereo systems, video systems or other display device, keyboard or keypad devices, or other I/O devices for use with specific applications such as card readers or other devices.

As mentioned above, I/O controller 1140 can interact with audio subsystem 1120 and/or display subsystem 1130. For example, input through a microphone or other audio device can provide input or commands for one or more applications or functions of device 1100. Additionally, audio output can be provided instead of or in addition to display output. In another example, if display subsystem includes a touchscreen, the display device also acts as an input device, which can be at least partially managed by I/O controller 1140. There can also be additional buttons or switches on device 1100 to provide I/O functions managed by I/O controller 1140.

In one embodiment, I/O controller 1140 manages devices such as accelerometers, cameras, light sensors or other environmental sensors, gyroscopes, global positioning system (GPS), or other hardware that can be included in device 1100. The input can be part of direct user interaction, as well as providing environmental input to the system to influence its operations (such as filtering for noise, adjusting displays for brightness detection, applying a flash for a camera, or other features). In one embodiment, device 1100 includes power management 1150 that manages battery power usage, charging of the battery, and features related to power saving operation.

Memory subsystem 1160 includes memory device(s) 1162 for storing information in device 1100. Memory subsystem 1160 can include nonvolatile (state does not change if power to the memory device is interrupted) and/or volatile (state is indeterminate if power to the memory device is interrupted) memory devices. Memory 1160 can store application data, user data, music, photos, documents, or other data, as well as system data (whether long-term or temporary) related to the execution of the applications and functions of system 1100. In one embodiment, memory subsystem 1160 includes memory controller 1164 (which could also be considered part of the control of system 1100, and could potentially be considered part of processor 1110). Memory controller 1164 includes a scheduler to generate and issue commands to memory device 1162.

Connectivity 1170 includes hardware devices (e.g., wireless and/or wired connectors and communication hardware) and software components (e.g., drivers, protocol stacks) to enable device 1100 to communicate with external devices. The external device could be separate devices, such as other computing devices, wireless access points or base stations, as well as peripherals such as headsets, printers, or other devices.

Connectivity 1170 can include multiple different types of connectivity. To generalize, device 1100 is illustrated with cellular connectivity 1172 and wireless connectivity 1174. Cellular connectivity 1172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1174 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 1180 include hardware interfaces and connectors, as well as software components (e.g., drivers, protocol stacks) to make peripheral connections. It will be understood that device 1100 could both be a peripheral device ("to" 1182) to other computing devices, as well as have peripheral devices ("from" 1184) connected to it. Device 1100 commonly has a "docking" connector to connect to other computing devices for purposes such as managing (e.g., downloading and/or uploading, changing, synchronizing) content on device 1100. Additionally, a docking connector can allow device 1100 to connect to certain peripherals that allow device 1100 to control content output, for example, to audiovisual or other systems.

In addition to a proprietary docking connector or other proprietary connection hardware, device 1100 can make peripheral connections 1180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

System 1100 includes multiple memory devices 1162 associated with memory controller 1164. In one embodiment, memory subsystem 1160 of system 1100 implements swizzle logic to uniquely map physical addresses provided by memory controller 1164 to physical locations of memory device 1162. More particularly, memory devices 1162 are organized as groups (e.g., a rank) of devices. Each memory device 1162 in the group uniquely maps each physical address to a different physical location of the respective memory devices based on scrambling of the row address information by swizzle logic.

In one aspect, a memory subsystem with memory devices that uniquely map a physical address to a memory row, including a common address bus to provide a physical address from an associated memory controller; and multiple memory devices coupled to the common address bus, each memory device including a memory array having multiple rows of memory, each row having a physical location uniquely addressable within the memory array; and interface elements to couple to the common address bus to receive the physical address provided by the associated memory controller, the same physical address to uniquely map to rows at different physical locations within the respective memory array of each respective memory device.

In one embodiment, the common address bus comprises an address bus of a dual inline memory module (DIMM). In one embodiment, the multiple memory devices comprise dual data rate dynamic random access memory devices. In one embodiment, the multiple memory devices comprise a memory rank. In one embodiment, the multiple memory devices comprise a memory device group. In one embodiment, the multiple memory devices coupled to the common address bus includes a number of memory devices that exceeds a capacity of bits in the physical address to uniquely map to rows at different locations of each respective memory device, and further comprising the physical address and an additional address signal line to uniquely map to rows at different physical locations within the respective memory arrays of each respective memory device. In one embodiment, the additional address signal comprises a bank address signal. In one embodiment, the additional address signal comprises an address inversion signal.

In one embodiment, the common address bus further comprises a number of signal lines, one for each bit of the physical address, where each signal line of the common address bus is mapped to different corresponding address connectors of each respective memory device. In one embodiment, each signal line is mapped to corresponding address connector of a first memory device, and mapped to successively offset address connectors of subsequent memory devices. In one embodiment, each memory device further comprises address mapping logic to map bits of the physical address to different rows within the respective memory device, wherein the address mapping logic of the multiple memory devices each is to implement a different mapping pattern from address mapping logic of the other memory devices. In one embodiment, each address mapping logic is to implement a different hash function to map the physical address. In one embodiment, each memory device has its mapping pattern registered with a BIOS (basic input/output system) of a computing device of which the memory subsystem is a part. In one embodiment, each memory device hashes row address bits for access to the memory array, but does not hash address bits for access to a Mode Register.

In one aspect, an electronic device with memory devices that uniquely map a physical address to a memory row, including a host hardware platform including a processor; a memory subsystem including a common address bus to provide a physical address from an associated memory controller; and multiple memory devices coupled to the common address bus, each memory device including a memory array having multiple rows of memory, each row having a physical location uniquely addressable within the memory array; and interface elements to couple to the common address bus to receive the physical address provided by the associated memory controller, the same physical address to uniquely map to rows at different physical locations within the respective memory array of each respective memory device; and a touchscreen display coupled to generate a display based on data accessed from the memory device.

In one embodiment, the common address bus comprises an address bus of a dual inline memory module (DIMM). In one embodiment, the multiple memory devices comprise dual data rate dynamic random access memory devices. In one embodiment, the multiple memory devices comprise a memory rank. In one embodiment, the multiple memory devices comprise a memory device group. In one embodiment, the multiple memory devices coupled to the common address bus includes a number of memory devices that exceeds a capacity of bits in the physical address to uniquely map to rows at different locations of each respective memory device, and further comprising the physical address and an additional address signal line to uniquely map to rows at different physical locations within the respective memory arrays of each respective memory device. In one embodiment, the additional address signal comprises a bank address signal. In one embodiment, the additional address signal comprises an address inversion signal.

In one embodiment, the common address bus further comprises a number of signal lines, one for each bit of the physical address, where each signal line of the common address bus is mapped to different corresponding address connectors of each respective memory device. In one embodiment, each signal line is mapped to corresponding address connector of a first memory device, and mapped to successively offset address connectors of subsequent memory devices. In one embodiment, each memory device further comprises address mapping logic to map bits of the physical address to different rows within the respective memory device, wherein the address mapping logic of the multiple memory devices each is to implement a different mapping pattern from address mapping logic of the other memory devices. In one embodiment, each address mapping logic is to implement a different hash function to map the physical address. In one embodiment, each memory device has its mapping pattern registered with a BIOS (basic input/output system) of a computing device of which the memory subsystem is a part. In one embodiment, each memory device hashes row address bits for access to the memory array, but does not hash address bits for access to a Mode Register.

In one aspect, a method for uniquely map a physical address to a memory row of different memory devices of a group includes receiving a memory access command from a memory controller, the memory access command including a physical address for the memory access command, the memory access command received on a common address bus to which multiple memory devices are coupled, wherein each memory device includes rows of memory with uniquely addressable physical locations within the memory device; and mapping the physical address from interface elements of the multiple memory devices to rows of memory devices, including uniquely mapping the physical address to different physical locations within each of the multiple memory devices.

In one embodiment, the common address bus comprises an address bus of a dual inline memory module (DIMM). In one embodiment, the multiple memory devices comprise dual data rate dynamic random access memory devices. In one embodiment, uniquely mapping the physical address to different physical locations within each of the multiple memory devices comprises uniquely mapping the physical address to different physical rows of each memory devices of a memory rank or memory device group. In one embodiment, the multiple memory devices coupled to the common address bus includes a number of memory devices that exceeds a capacity of row address bits in the physical address to uniquely map to rows at different locations of each respective memory device, and wherein mapping the physical address further comprises uniquely mapping the physical address based on both row address bits as well as an additional address signal bit. In one embodiment, the additional address signal comprises one of a bank address signal, an address inversion signal, or both. In one embodiment, the common address bus includes a number of signal lines, one for each bit of the physical address, and wherein mapping the physical address from the interface elements to the multiple memory devices comprises uniquely mapping the signal lines to different corresponding address connectors of each respective memory device.

In one embodiment, mapping the physical address to the multiple memory devices further comprises hashing the physical address at each memory device to implement a unique mapping pattern for each memory device. In one embodiment, the common address bus further comprises a number of signal lines, one for each bit of the physical address, wherein mapping the physical address from the interface elements to the multiple memory devices comprises mapping the address to different corresponding address connectors of each respective memory device. In one embodiment, mapping the physical address from the interface elements to the multiple memory devices comprises mapping each signal line to corresponding address connector of a first memory device, and mapping to successively offset address connectors of subsequent memory devices. In one embodiment, mapping the physical address from the interface elements to the multiple memory devices comprises implementing a different mapping pattern for each of the memory devices. In one embodiment, implementing the different mapping pattern comprises implementing a different hash function to map the physical address. In one embodiment, the method further comprising registering the mapping pattern of each memory device with a BIOS (basic input/output system) of a computing device of which the memory subsystem is a part. In one embodiment, the method further comprising determining if a command is for access to a Mode Register; and hashing row address bits for access to the memory array, and not hashing address bits for access to the Mode Register.

In one aspect, an apparatus for uniquely map a physical address to a memory row of different memory devices of a group includes means for receiving a memory access command from a memory controller, the memory access command including a physical address for the memory access command, the memory access command received on a common address bus to which multiple memory devices are coupled, wherein each memory device includes rows of memory with uniquely addressable physical locations within the memory device; and means for mapping the physical address from interface elements of the multiple memory devices to rows of memory devices, including uniquely mapping the physical address to different physical locations within each of the multiple memory devices.

In one embodiment, the common address bus comprises an address bus of a dual inline memory module (DIMM). In one embodiment, the multiple memory devices comprise dual data rate dynamic random access memory devices. In one embodiment, the means for uniquely mapping the physical address to different physical locations within each of the multiple memory devices comprises means for uniquely mapping the physical address to different physical rows of each memory devices of a memory rank or memory device group. In one embodiment, the multiple memory devices coupled to the common address bus includes a number of memory devices that exceeds a capacity of row address bits in the physical address to uniquely map to rows at different locations of each respective memory device, and wherein the means for mapping the physical address further comprises means for uniquely mapping the physical address based on both row address bits as well as an additional address signal bit. In one embodiment, the additional address signal comprises one of a bank address signal, an address inversion signal, or both.

In one embodiment, the common address bus includes a number of signal lines, one for each bit of the physical address, and wherein the means for mapping the physical address from the interface elements to the multiple memory devices comprises means for uniquely mapping the signal lines to different corresponding address connectors of each respective memory device. In one embodiment, the means for mapping the physical address to the multiple memory devices further comprises means for hashing the physical address at each memory device to implement a unique mapping pattern for each memory device. In one embodiment, the common address bus further comprises a number of signal lines, one for each bit of the physical address, wherein the means for mapping the physical address from the interface elements to the multiple memory devices comprises means for mapping the address to different corresponding address connectors of each respective memory device. In one embodiment, the means for mapping the physical address from the interface elements to the multiple memory devices comprises means for mapping each signal line to corresponding address connector of a first memory device, and mapping to successively offset address connectors of subsequent memory devices.

In one embodiment, the means for mapping the physical address from the interface elements to the multiple memory devices comprises means for implementing a different mapping pattern for each of the memory devices. In one embodiment, the means for implementing the different mapping pattern comprises means for implementing a different hash function to map the physical address. In one embodiment, the apparatus further comprising means for registering the mapping pattern of each memory device with a BIOS (basic input/output system) of a computing device of which the memory subsystem is a part. In one embodiment, the apparatus further comprising means for determining if a command is for access to a Mode Register; and means for hashing row address bits for access to the memory array, and not hashing address bits for access to the Mode Register.

In one aspect, an article of manufacture comprising a computer readable storage medium having content stored thereon, which when executed by a computing device performs operation including: receiving a memory access command from a memory controller, the memory access command including a physical address for the memory access command, the memory access command received on a common address bus to which multiple memory devices are coupled, wherein each memory device includes rows of memory with uniquely addressable physical locations within the memory device; and mapping the physical address from interface elements of the multiple memory devices to rows of memory devices, including uniquely mapping the physical address to different physical locations within each of the multiple memory devices.

In one embodiment, the common address bus comprises an address bus of a dual inline memory module (DIMM). In one embodiment, the multiple memory devices comprise dual data rate dynamic random access memory devices. In one embodiment, the content for uniquely mapping the physical address to different physical locations within each of the multiple memory devices comprises content for uniquely mapping the physical address to different physical rows of each memory devices of a memory rank or memory device group. In one embodiment, the multiple memory devices coupled to the common address bus includes a number of memory devices that exceeds a capacity of row address bits in the physical address to uniquely map to rows at different locations of each respective memory device, and wherein the content for mapping the physical address further comprises content for uniquely mapping the physical address based on both row address bits as well as an additional address signal bit. In one embodiment, the additional address signal comprises one of a bank address signal, an address inversion signal, or both.

In one embodiment, the common address bus includes a number of signal lines, one for each bit of the physical address, and wherein the content for mapping the physical address from the interface elements to the multiple memory devices comprises content for uniquely mapping the signal lines to different corresponding address connectors of each respective memory device. In one embodiment, the content for mapping the physical address to the multiple memory devices further comprises content for hashing the physical address at each memory device to implement a unique mapping pattern for each memory device. In one embodiment, the common address bus further comprises a number of signal lines, one for each bit of the physical address, wherein the content for mapping the physical address from the interface elements to the multiple memory devices comprises content for mapping the address to different corresponding address connectors of each respective memory device. In one embodiment, the content for mapping the physical address from the interface elements to the multiple memory devices comprises content for mapping each signal line to corresponding address connector of a first memory device, and mapping to successively offset address connectors of subsequent memory devices. In one embodiment, wherein the content for mapping the physical address from the interface elements to the multiple memory devices comprises content for implementing a different mapping pattern for each of the memory devices. In one embodiment, the content for implementing the different mapping pattern comprises content for implementing a different hash function to map the physical address. In one embodiment, the article of manufacture further comprising content for registering the mapping pattern of each memory device with a BIOS (basic input/output system) of a computing device of which the memory subsystem is a part. In one embodiment, the article of manufacture further comprising content for determining if a command is for access to a Mode Register; and content for hashing row address bits for access to the memory array, and not hashing address bits for access to the Mode Register.

Flow diagrams as illustrated herein provide examples of sequences of various process actions. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory subsystem comprising:
   a common address bus to provide a physical address from an associated memory controller; and
   multiple memory devices within a same rank of a dual inline memory module coupled to the common address bus, each memory device including:
      a memory array having multiple rows of memory, each row having a physical location uniquely addressable within the memory array; and
      interface elements to couple to the common address bus to receive the physical address provided by the associated memory controller, the same physical address to uniquely map to rows at different active physical locations within the respective memory arrays of the memory devices such that no memory device within the rank has a same physical address to row mapping as any other memory device within the rank and such that each of the different active physical locations are concurrently accessed as the physical address's target in response to each memory device receiving the physical address, wherein, the interface elements collectively implement the unique physical address to row mapping for core accesses of the memory devices but not for mode register accesses of the memory devices.

2. The memory subsystem of claim 1, wherein the multiple memory devices comprise dual data rate dynamic random access memory devices.

3. The memory subsystem of claim 1, wherein the multiple memory devices comprise a memory device group.

4. The memory subsystem of claim 1, wherein the multiple memory devices coupled to the common address bus includes a number of memory devices that exceeds a capacity of bits in the physical address to uniquely map to rows at different locations of each respective memory device, and further comprising the physical address and an additional address signal line to uniquely map to rows at different physical locations within the respective memory arrays of each respective memory device.

5. The memory subsystem of claim 4, wherein the additional address signal line comprises a bank address signal line.

6. The memory subsystem of claim 4, wherein the additional address signal line comprises an address inversion signal line.

7. The memory subsystem of claim 1, wherein the common address bus further comprises a number of signal lines, one for each bit of the physical address, where each signal line of the common address bus is mapped to different corresponding address connectors of each respective memory device.

8. The memory subsystem of claim 7, wherein each signal line is mapped to a corresponding address connector of a first memory device, and mapped to successively offset address connectors of subsequent memory devices.

9. The memory subsystem of claim 1, wherein each memory device further comprises address mapping logic to map bits of the physical address to different rows within respective memory devices, wherein the address mapping logic of the multiple memory devices each is to implement a different mapping pattern from address mapping logic of other memory devices.

10. The memory subsystem of claim 9, wherein each address mapping logic is to implement a different hash function to map the physical address.

11. The memory subsystem of claim 9, wherein each memory device has its mapping pattern registered with a BIOS (basic input/output system) of a computing device of which the memory subsystem is a part.

12. The memory subsystem of claim 9, wherein each memory device is to hash row address bits for access to the memory array, but does not hash address bits for access to a Mode Register.

13. An electronic device comprising:
a host hardware platform including a processor;
a memory subsystem including
a common address bus to provide a physical address from an associated memory controller; and
multiple memory devices within a same rank of a dual-in line module coupled to the common address bus, each memory device including
a memory array having multiple rows of memory, each row having a physical location uniquely addressable within the memory array; and
interface elements to couple to the common address bus to receive the physical address provided by the associated memory controller, the same physical address to uniquely map to rows at different active physical locations within the respective memory arrays of the memory devices such that no memory device within the rank has a same physical address to row mapping as any other memory device within the rank and such that each of the different active physical locations are concurrently accessed as the physical address's target in response to each memory device receiving the physical address, wherein, the interface elements collectively implement the unique physical address to row mapping for core accesses of the memory devices but not for mode register accesses of the memory devices; and
a touchscreen display coupled to generate a display based on data accessed from the memory device.

14. The electronic device of claim 13, wherein the common address bus further comprises a number of signal lines, one for each bit of the physical address, where each signal line of the common address bus is mapped to different corresponding address connectors of each respective memory device.

15. The electronic device of claim 13, wherein each memory device further comprises address mapping logic to map bits of the physical address to different rows within respective memory devices, wherein the address mapping logic of the multiple memory devices each is to implement a different mapping pattern from address mapping logic of other memory devices.

16. A method, comprising:
receiving a core memory access command from a memory controller, the core memory access command including a physical address for the core memory access command, the core memory access command received on a common address bus to which multiple memory devices within a same rank of a dual-in line module are coupled, wherein each memory device includes rows of memory with uniquely addressable physical locations within the memory device;
mapping the physical address from interface elements of the multiple memory devices to rows of the multiple memory devices, including uniquely mapping the physical address to different active physical locations within each of the multiple memory devices such that no memory device within the rank has a same physical address to row mapping as any other memory device within the rank and such that each of the different active physical locations are concurrently accessed as the physical address's target in response to each memory device receiving the physical address; and
receiving a mode register access command from the memory controller and refraining from uniquely mapping the mode register's physical address to different active physical locations within the multiple memory devices.

17. The method of claim 16, wherein the multiple memory devices coupled to the common address bus includes a number of memory devices that exceeds a capacity of row address bits in the physical address to uniquely map to rows at different locations of each respective memory device, and wherein mapping the physical address further comprises uniquely mapping the physical address based on both row address bits as well as an additional address signal bit.

18. The method of claim 16, wherein the common address bus includes a number of signal lines, one for each bit of the physical address, and wherein mapping the physical address from the interface elements to the multiple memory devices comprises uniquely mapping the signal lines to different corresponding address connectors of each respective memory device.

19. The method of claim 16, wherein mapping the physical address to the multiple memory devices further comprises hashing the physical address at each memory device to implement a unique mapping pattern for each memory device.

* * * * *